United States Patent
Ma et al.

(10) Patent No.: US 11,561,020 B2
(45) Date of Patent: Jan. 24, 2023

(54) AIR CONDITIONING SYSTEM, AND DEFROSTING CONTROL METHOD AND DEVICE THEREOF

(71) Applicants: GD MIDEA HEATING & VENTILATING EQUIPMENT CO., LTD., Foshan (CN); MIDEA GROUP CO., LTD., Foshan (CN)

(72) Inventors: Xihua Ma, Foshan (CN); Yongfeng Xu, Foshan (CN); Meibing Xiong, Foshan (CN); Linxing Ren, Foshan (CN)

(73) Assignees: GD MIDEA HEATING & VENTILATING EQUIPMENT CO., LTD., Guangdong (CN); MIDEA GROUP CO., LTD., Guangdong (CN)

( * ) Notice: Subject to any disclaimer, the term of this patent is extended or adjusted under 35 U.S.C. 154(b) by 172 days.

(21) Appl. No.: 16/627,835

(22) PCT Filed: Nov. 2, 2017

(86) PCT No.: PCT/CN2017/109129
§ 371 (c)(1),
(2) Date: Dec. 31, 2019

(87) PCT Pub. No.: WO2019/075785
PCT Pub. Date: Apr. 25, 2019

(65) Prior Publication Data
US 2020/0141602 A1 May 7, 2020

(30) Foreign Application Priority Data

Oct. 18, 2017 (CN) .......................... 201710972577.2

(51) Int. Cl.
*F24F 11/42* (2018.01)
*F24F 11/64* (2018.01)
(Continued)

(52) U.S. Cl.
CPC .............. *F24F 11/42* (2018.01); *F24F 11/64* (2018.01); *F24F 11/65* (2018.01); *G05B 15/02* (2013.01)

(58) Field of Classification Search
CPC .. F24F 11/42; F24F 11/64; F24F 11/65; F24F 11/61; F24F 2110/12; G05B 15/02
(Continued)

(56) References Cited

U.S. PATENT DOCUMENTS 5,515,689 A * 5/1996 Atterbury ............. F25D 21/006
62/155
2005/0241324 A1 * 11/2005 Cho ....................... F25D 21/006
62/150
(Continued)

FOREIGN PATENT DOCUMENTS

| CN | 104567148 A | 4/2015 |
| CN | 104567148 B | 4/2015 |

(Continued)

OTHER PUBLICATIONS

International Search Report and Written Opinion dated Jun. 7, 2018 from the State Intellectual Property Office of the P.R. China.
(Continued)

*Primary Examiner* — Michael W Choi
(74) *Attorney, Agent, or Firm* — Dilworth & Barrese, LLP.; Michael J. Musella, Esq.

(57) ABSTRACT

An air conditioning system and a defrosting control method and device thereof including: obtaining defrosting exit time determined in previous defrosting, and controlling the air conditioning system to perform this defrosting according to the defrosting exit time determined in the previous defrosting; in this defrosting process of the air conditioning system, obtaining the temperature of an outdoor environment, and obtaining the temperature of an outlet of an outdoor heat
(Continued)

exchanger; determining the temperature of the outdoor environment and the temperature of the outlet of the outdoor heat exchanger; and if the temperature of the outlet of the outdoor heat exchanger is lower than a first preset temperature and lasts a preset time and the temperature of the outdoor environment is lower than a second preset temperature, obtaining forced defrosting time serving as the defrosting exit time of the next defrosting of the air conditioning system, and storing the time.

11 Claims, 3 Drawing Sheets

(51) Int. Cl.
    *F24F 11/65*     (2018.01)
    *G05B 15/02*     (2006.01)

(58) Field of Classification Search
    USPC .......................................................... 700/278
    See application file for complete search history.

(56) References Cited

U.S. PATENT DOCUMENTS

| | | | |
|---|---|---|---|
| 2013/0118188 A1 | 5/2013 | Mckie | |
| 2015/0027144 A1* | 1/2015 | Lee | F24D 15/04 62/80 |
| 2016/0238301 A1* | 8/2016 | Denton | F24F 11/30 |

FOREIGN PATENT DOCUMENTS

| | | | |
|---|---|---|---|
| CN | 104567150 | A | 4/2015 |
| CN | 104596032 | A | 5/2015 |
| CN | 104776549 | A | 7/2015 |
| CN | 105004000 | A | 10/2015 |
| CN | 105135629 | A | 12/2015 |
| CN | 105135629 | B | 12/2015 |
| CN | 105157290 | A | 12/2015 |
| CN | 105605840 | A | 5/2016 |
| CN | 105910237 | A | 8/2016 |
| CN | 106052229 | A | 10/2016 |
| CN | 106288134 | A | 1/2017 |
| CN | 106288162 | A | 1/2017 |
| CN | 106705347 | A | 5/2017 |
| CN | 106931694 | A | 7/2017 |
| CN | 106958926 | A | 7/2017 |
| CN | 107036347 | A | 8/2017 |
| CN | 107166639 | A | 9/2017 |
| CN | 107192094 | A | 9/2017 |
| JP | H0921555 | A | 1/1997 |
| JP | 2003139445 | A | 5/2003 |
| WO | 2010032430 | A1 | 3/2010 |

OTHER PUBLICATIONS

Chinese Office Action dated Apr. 11, 2019.
First Canadian Office Action from Canadian Patent Application No. 3,069,355 dated Apr. 7, 2021.

* cited by examiner

AIR CONDITIONING SYSTEM, AND DEFROSTING CONTROL METHOD AND DEVICE THEREOF

The present disclosure is a national stage filing of international application PCT/CN2017/109129, filed on Nov. 2, 2017, and claims priority to Chinese Patent Application No. 201710972577.2, filed on Oct. 18, 2017, the entire contents of each or which are incorporated herein by reference.

FIELD

The present application relates to the field of air conditioning technology, in particular to a defrosting control method for an air conditioning system, a defrosting control device for an air conditioning system and an air conditioning system including the defrosting control device.

BACKGROUND

In an air conditioning system, when frost formation occurs in an air conditioner operating in a heating mode, it should be switched into a refrigeration mode, under which an outdoor heat exchanger serves as a condenser to melt a frost layer. In the related art, a forced exit time have to be set for a defrosting process to avoid defrosting for a long time that prevents the indoor unit from heating. Generally, as the exit time is fixed and unchanged, a time length set for the fixed exit time should meet requirements for all operation environments. When the exit time is set to be too short, it is impossible to achieve a desired defrosting effect, i.e., the heat exchanger cannot melt the frost layer completely on surface, if the air conditioning system is affected by rain and snow from outside. When the exit time is set to be too long, if the desired defrosting effect can be achieved in short time as the frosting layer is not thick under a low temperature and low moisture environment, it is difficult for the air conditioning system to meet exit requirement, accordingly it is impossible for an indoor unit to heat as the defrosting is performed too long and thus the indoor heating effect is affected.

SUMMARY

The present disclosure aims to solve at least one of the above technical problems in the related art to some extent. Therefore, a first object of the present disclosure is to provide a defrosting control method for an air conditioning system, which can adjust a defrosting exit time according to an outdoor ambient temperature, an outlet temperature of an outdoor heat exchanger and its lasting period, thus ensuring the defrosting effect without adversely affecting heat exchange effect.

A second object of the present disclosure is to provide a non-transitory computer readable storage medium.

A third object of the present disclosure is to provide a defrosting control device for an air conditioning system.

A fourth object of the present disclosure is to provide an air conditioning system.

In order to achieve the above objects, in the first aspect, the present disclosure provides in embodiments a defrosting control method for an air conditioning system, including the following steps: acquiring a defrosting exit time determined in last defrosting when the air conditioning system performs defrosting every time; and controlling, according to the defrosting exit time determined in the last defrosting, the air conditioning system to perform current defrosting; acquiring an outdoor ambient temperature and an outlet temperature of an outdoor heat exchanger in the current defrosting process of the air conditioning system; subjecting the outdoor ambient temperature and the outlet temperature of the outdoor heat exchanger to respective judgments; and acquiring and storing a forced defrosting time as a defrosting exit time for the air conditioning system to perform next defrosting, if the outlet temperature of the outdoor heat exchanger is lower than a first preset temperature for a preset time period and the outdoor ambient temperature is lower than a second preset temperature, wherein the forced defrosting time is longer than the defrosting time of the air conditioning system for performing the current defrosting.

According to embodiments of the present disclosure, the defrosting control method for an air conditioning system acquires a defrosting exit time determined in last defrosting when the air conditioning system performs defrosting every time; controls, according to the defrosting exit time determined in the last defrosting, the air conditioning system to perform current defrosting; acquires an outdoor ambient temperature and an outlet temperature of an outdoor heat exchanger in the current defrosting process of the air conditioning system; subjects the outdoor ambient temperature and the outlet temperature of the outdoor heat exchanger to respective judgments; and acquires and stores a forced defrosting time as a defrosting exit time for the air conditioning system to perform next defrosting, if the outlet temperature of the outdoor heat exchanger is lower than a first preset temperature for a preset time period and the outdoor ambient temperature is lower than a second preset temperature. Therefore, the present method can adjust the defrosting exit time according to the outdoor ambient temperature and the outlet temperature of the outdoor heat exchanger and its lasting period, so as to ensure the defrosting effect without adversely affecting the heat exchange effect.

In addition, the defrosting control method for an air conditioning system, proposed according to the above embodiments of the present disclosure, is further characterized by the following additional features.

In an embodiment of the present disclosure, in the current defrosting process of the air conditioning system, if the outlet temperature of the outdoor heat exchanger is higher than or equal to the first preset temperature for the preset time period, or if the outdoor ambient temperature is higher than or equal to the second preset temperature, the defrosting time of the air conditioning system for performing the current defrosting is taken and stored as a defrosting exit time for the air conditioning system to perform next defrosting.

In an embodiment of the present disclosure, when the air conditioning system performs defrosting for the first time, an initial defrosting exit time is acquired, and the air conditioning system is controlled to perform the current defrosting according to the initial defrosting exit time.

In an embodiment of the present disclosure, in the first-time defrosting process of the air conditioning system, if the outlet temperature of the outdoor heat exchanger is higher than or equal to the first preset temperature for the preset time period, or if the outdoor ambient temperature is higher than or equal to the second preset temperature, the initial defrosting exit time is taken and stored as the defrosting exit time for the air conditioning system to perform the next defrosting.

In order to achieve the above objects, in the second aspect, the present disclosure provides in embodiments a non-transitory computer readable storage medium having stored therein a computer program that, when executed by a processor, causes the processor to perform a defrosting control method for an air conditioning system as described above.

By performing the defrosting control method for an air conditioning system as described above, the non-transitory computer readable storage medium according to embodiments of the present disclosure can adjust the defrosting exit time according to the outdoor ambient temperature and the outlet temperature of the outdoor heat exchanger and its lasting period, so as to ensure the defrosting effect without adversely affecting the heat exchange effect.

In order to achieve the above objects, in the third aspect, the present disclosure provides in embodiments a defrosting control device for an air conditioning system, including: a first acquiring module, configured to acquire a defrosting exit time determined in last defrosting when the air conditioning system performs defrosting every time; a controlling module, configured to control, according to the defrosting exit time determined in the last defrosting, the air conditioning system to perform current defrosting; a second acquiring module, configured to acquire an outdoor ambient temperature and an outlet temperature of an outdoor heat exchanger in the current defrosting process of the air conditioning system; and a judging module, configured to subject the outdoor ambient temperature and the outlet temperature of the outdoor heat exchanger to respective judgments, wherein the controlling module is further configured to acquire and store a forced defrosting time as a defrosting exit time for the air conditioning system to perform next defrosting, when the outlet temperature of the outdoor heat exchanger is lower than a first preset temperature for a preset time period and the outdoor ambient temperature is lower than a second preset temperature, wherein the forced defrosting time is longer than the defrosting time of the air conditioning system for performing the current defrosting.

According to embodiments of the present disclosure, the defrosting control device for an air conditioning system acquires by a first acquiring module, a defrosting exit time determined in last defrosting when the air conditioning system performs defrosting every time; controls by a controlling module, according to the defrosting exit time determined in the last defrosting, the air conditioning system to perform current defrosting; acquires by the second acquiring module, an outdoor ambient temperature and an outlet temperature of an outdoor heat exchanger in the current defrosting process of the air conditioning system; subjects by a judging module, the outdoor ambient temperature and the outlet temperature of the outdoor heat exchanger to respective judgments; and acquires and stores by the controlling module, a forced defrosting time as a defrosting exit time for the air conditioning system to perform next defrosting, if the outlet temperature of the outdoor heat exchanger is lower than a first preset temperature for a preset time period and the outdoor ambient temperature is lower than a second preset temperature. Therefore, the present device can adjust the defrosting exit time according to the outdoor ambient temperature and the outlet temperature of the outdoor heat exchanger and its lasting period, so as to ensure the defrosting effect without adversely affecting the heat exchange effect.

In addition, the defrosting control device for an air conditioning system, proposed according to the above embodiments of the present disclosure, is further characterized by the following additional features.

In an embodiment of the present disclosure, in the current defrosting process of the air conditioning system, if the outlet temperature of the outdoor heat exchanger is higher than or equal to the first preset temperature for the preset time period, or if the outdoor ambient temperature is higher than or equal to the second preset temperature, the controlling module is configured to take and store the defrosting time of the air conditioning system for performing the current defrosting as a defrosting exit time for the air conditioning system to perform next defrosting.

In an embodiment of the present embodiment, when the air conditioning system performs defrosting for the first time, the controlling module is configured to acquire an initial defrosting exit time by the first acquiring module; and control the air conditioning system to perform the current defrosting according to the initial defrosting exit time.

In an embodiment of the present embodiment, in the first-time defrosting process of the air conditioning system, if the outlet temperature of the outdoor heat exchanger is higher than or equal to the first preset temperature for the preset time period, or if the outdoor ambient temperature is higher than or equal to the second preset temperature, the controlling module is configured to take and store the initial defrosting exit time as the defrosting exit time for the air conditioning system to perform the next defrosting.

In order to achieve the above objects, in the fourth aspect, the present disclosure provides in embodiments an air conditioning system, including a defrosting control device for an air conditioning system as described above.

With the defrosting control device for an air conditioning system as described above, the air conditioning system according to embodiments of the present disclosure can adjust the defrosting exit time according to the outdoor ambient temperature and the outlet temperature of the outdoor heat exchanger and its lasting period, so as to ensure the defrosting effect without adversely affecting the heat exchange effect.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

Description will be made hereinafter to a defrosting control method for an air conditioning system, a defrosting control device for an air conditioning system and an air conditioning system including the same according to embodiments of the present disclosure with reference to the accompanying drawings.

Figure 1:
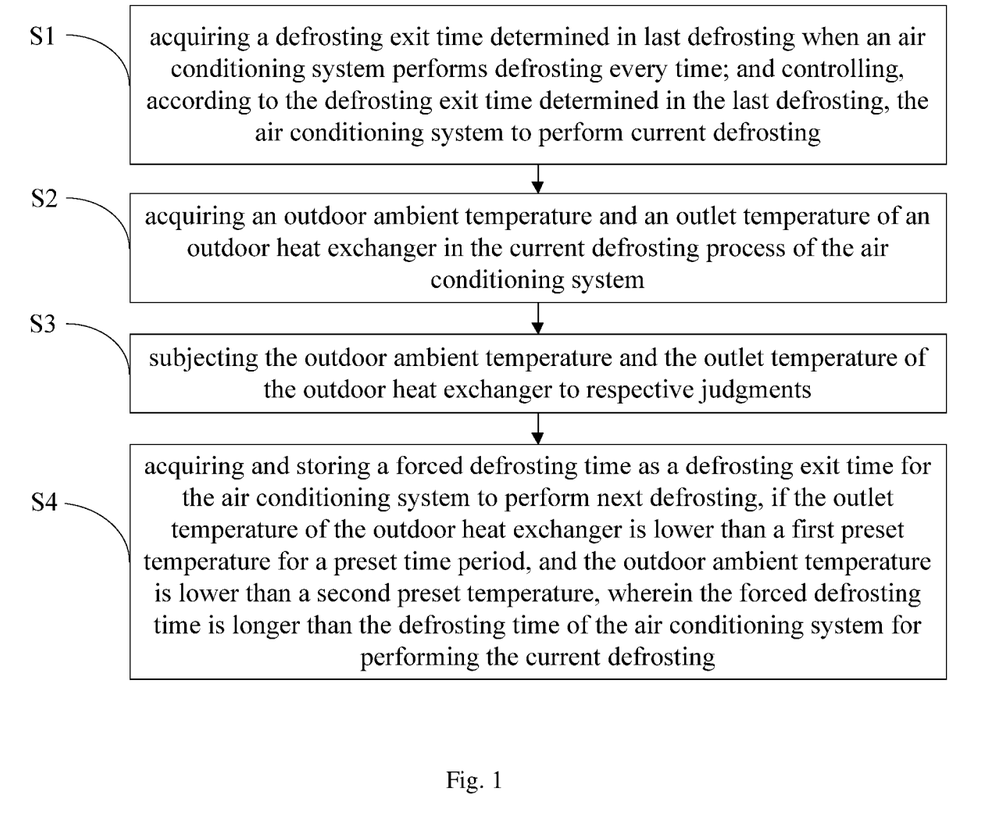
FIG. 1 is a flow chart showing a defrosting control method for an air conditioning system according to an embodiment of the present disclosure.

FIG. 1 is a flow chart showing a defrosting control method for an air conditioning system according to an embodiment of the present disclosure.

As shown in FIG. 1, in embodiments of the present disclosure, the defrosting control method for an air conditioning system may include the following steps:

S1, acquiring a defrosting exit time determined in last defrosting when the air conditioning system performs defrosting every time; and controlling, according to the defrosting exit time determined in the last defrosting, the air conditioning system to perform current defrosting;

In an embodiment of the present disclosure, when the air conditioning system performs defrosting for the first time, an initial defrosting exit time is acquired, and the air conditioning system is controlled to perform the current defrosting according to the initial defrosting exit time.

That is, if the air conditioning system starts defrosting for the first time, the air conditioning system is controlled to perform the defrosting according to the initial defrosting exit time (which can be obtained through a large amount of experimental test data). If it is not the first time for the air conditioning system to start defrosting, the air conditioning system is controlled to perform the current defrosting according to the defrosting time determined in the last defrosting.

S2, acquiring an outdoor ambient temperature and an outlet temperature of an outdoor heat exchanger in the current defrosting process of the air conditioning system.

The outdoor ambient temperature Tout can be acquired in real time by an outdoor ambient temperature sensor; and the outlet temperature Tg of the outdoor heat exchanger can be acquired by a temperature sensor disposed at an outlet of the outdoor heat exchanger S3, subjecting the outdoor ambient temperature and the outlet temperature of the outdoor heat exchanger to respective judgments.

S4, acquiring and storing a forced defrosting time as a defrosting exit time for the air conditioning system to perform next defrosting, if the outlet temperature of the outdoor heat exchanger is lower than a first preset temperature for a preset time period and the outdoor ambient temperature is lower than a second preset temperature, wherein the forced defrosting time is longer than the defrosting time of the air conditioning system for performing the current defrosting, which can be specifically demarcated depending on actual situation. The preset time period, the first preset temperature and the second preset temperature can be demarcated depending on actual situation.

In an embodiment of the present disclosure, in the current defrosting process of the air conditioning system, if the outlet temperature of the outdoor heat exchanger is higher than or equal to the first preset temperature for the preset time period, or if the outdoor ambient temperature is higher than or equal to the second preset temperature, the defrosting time of the air conditioning system for performing the current defrosting is taken and stored as a defrosting exit time for the air conditioning system to perform next defrosting.

In an embodiment of the present disclosure, in the first-time defrosting process of the air conditioning system, if the outlet temperature of the outdoor heat exchanger is higher than or equal to the first preset temperature for the preset time period, or if the outdoor ambient temperature is higher than or equal to the second preset temperature, the initial defrosting exit time is taken and stored as the defrosting exit time for the air conditioning system to perform the next defrosting.

In specific, the air conditioning system starting the defrosting for the first time is taken as an example. After the air conditioning system starts the defrosting, an initial defrosting exit time t1 is acquired and the air conditioning system is controlled to perform current defrosting according to the initial defrosting exit time t1, during which an outdoor ambient temperature Tout and an outlet temperature Tg of an outdoor heat exchanger at that time are acquired and subjected to respective judgments. If the outlet temperature Tg of the outdoor heat exchanger <the first preset temperature T1 for the preset time period ta and the outdoor ambient temperature Tout <the second preset temperature T2, it is indicated that the current ambient and operating conditions are poor or the frost layer is thick, thus the defrosting time is required to be extended to further melt frost on the surface of the outdoor heat exchanger, so as to guarantee the heat exchanger with a capacity of exchanging heat in a heating mode. Accordingly, the forced defrosting time acquired is taken and stored as the defrosting exit time for the air conditioning system to perform the next defrosting which can be used for the air conditioning system to start the next defrosting.

If the outlet temperature Tg of the outdoor heat exchanger ≥the first preset temperature T1 for the preset time period ta; or if the outdoor ambient temperature Tout ≥the second preset temperature T2, it is indicated that the current ambient and operating conditions are improved or the frost layer is thin, thus the defrosting time for the air conditioning system preforming the current frostings (in this example, the defrosting time for the air conditioning system preforming the current frosting is the initial defrosting exit time) can be taken and stored as the defrosting exit time for the air conditioning system to perform the next frosting which can be used for the air conditioning system to start the next defrosting.

In an embodiment of the present disclosure, the forced defrosting time is not a fixed value, which can be determined according to the defrosting exit time determined in the last defrosting.

Figure 2:
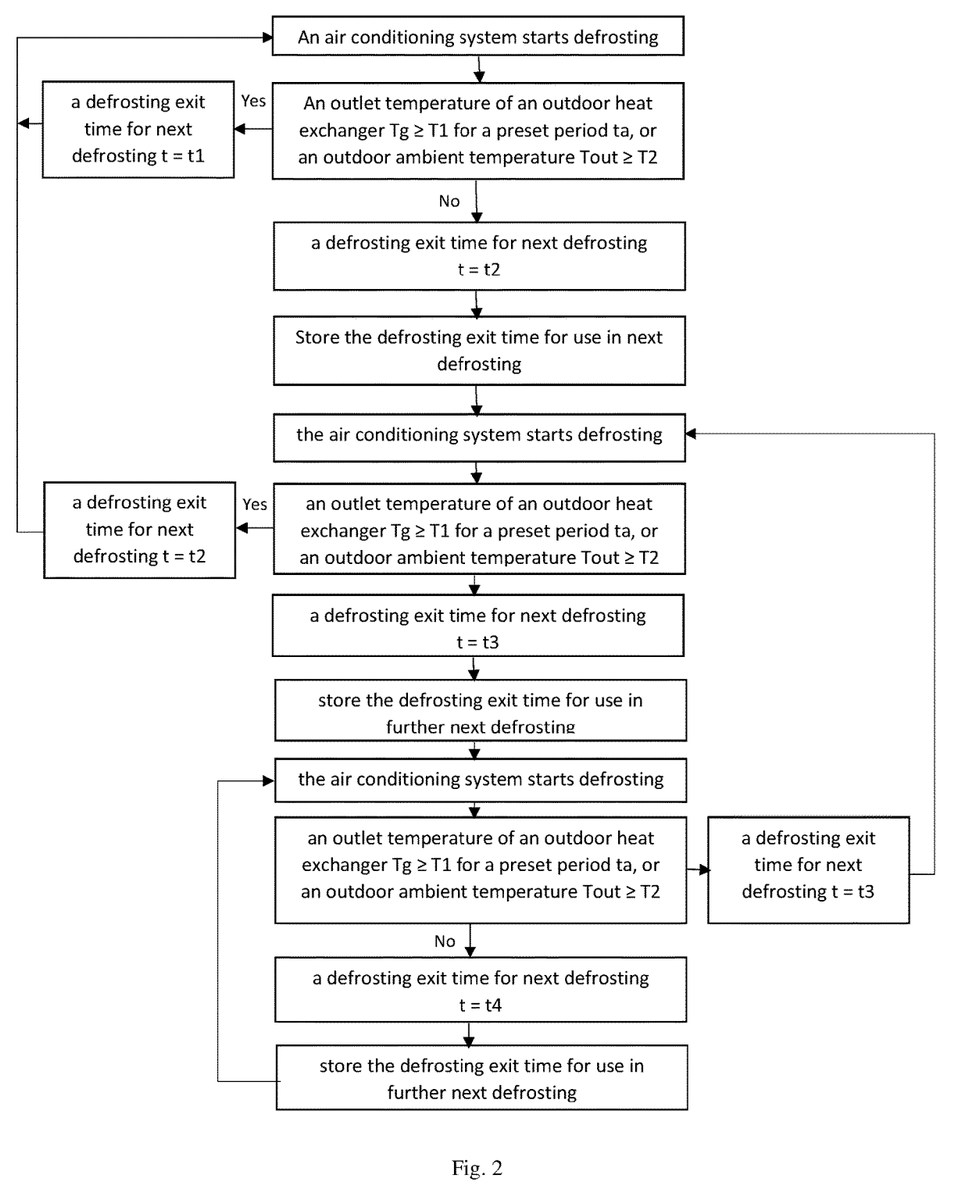
FIG. 2 is a logic diagram showing a defrosting control method for an air conditioning system according to a specific embodiment of the present disclosure.

In a specific embodiment, as shown in FIG. 2, the air conditioning system starting the defrosting for the first time is taken as another example.

When the air conditioning system starts defrosting for the first time, the initial defrosting exit time is t1. In the first-time defrosting process of the air conditioning system, the outlet temperature Tg of the outdoor heat exchanger and the outdoor ambient temperature Tout are subjected to judgment. If the following judging conditions are met: Tg≥T1 for ta; or Tout≥T2, the defrosting exit time for next defrosting t=t1, otherwise the defrosting exit time for next defrosting t=t2 (t2 is a forced defrosting time at this time), where t1<t2. After determined, the defrosting exit time for next defrosting is stored which will be used in next defrosting.

In the second-time defrosting process of the air conditioning system, when the defrosting exit time determined in the last defrosting is t1 as meeting the judging conditions, if Tg≥T1 for ta; or Tout≥T2, the defrosting exit time for next defrosting t=t1, otherwise the defrosting exit time for next defrosting t=t2 (t2 is a forced defrosting time at this time); when the defrosting exit time determined in the last defrosting is t2 as failing to meet the judging conditions, if Tg≥T1 for ta; or Tout≥T2, the defrosting exit time for next defrosting t=t2, otherwise the defrosting exit time for next defrosting t=t3 (t3 is another forced defrosting time at this time), where t2≤t3. After determined, the defrosting exit time for next defrosting is stored which will be used in next defrosting.

In the third-time defrosting process of the air conditioning system, when the defrosting exit time determined in the last defrosting is t1 as meeting the judging conditions, if Tg≥T1 for ta; or Tout≥T2, the defrosting exit time for next defrosting t=t1, otherwise the defrosting exit time for next defrosting t=t2 (t2 is a forced defrosting time at this time); when the defrosting exit time determined in the last defrosting is t2 as failing to meet the judging conditions, if Tg≥T1 for ta; or Tout≥T2, the defrosting exit time for next defrosting t=t2, otherwise the defrosting exit time for next defrosting t=t3 (t3 is another forced defrosting time at this time); when the defrosting exit time determined in the last defrosting is t2 as meeting the judging conditions, if Tg≥T1 for ta; or Tout≥T2, the defrosting exit time for next defrosting t=t1, otherwise the defrosting exit time for next defrosting t=t2 (t2 is a forced defrosting time at this time); and when the defrosting exit time determined in the last defrosting is t3 as failing to meet the judging conditions, if Tg≥T1 for ta; or Tout≥T2, the defrosting exit time for next defrosting t=t3, otherwise the defrosting exit time for next defrosting t=t4 (t4 is yet another forced defrosting time at this time), where t3≤t4.

In the fourth-time defrosting process of the air conditioning system, when the defrosting exit time determined in the last defrosting is t1 as meeting the judging conditions, if Tg≥T1 for ta; or Tout≥T2, the defrosting exit time for next defrosting t=t1, otherwise the defrosting exit time for next defrosting t=t2 (t2 is a forced defrosting time at this time); when the defrosting exit time determined in the last defrosting is t2 as failing to meet the judging conditions, if Tg≥T1 for ta; or Tout≥T2, the defrosting exit time for next defrosting t=t2, otherwise the defrosting exit time for next defrosting t=t3 (t3 is another forced defrosting time at this time); when the defrosting exit time determined in the last defrosting is t2 as meeting the judging conditions, if Tg≥T1 for ta; or Tout≥T2, the defrosting exit time for next defrosting t=t1, otherwise the defrosting exit time for next defrosting t=t2 (t2 is a forced defrosting time at this time); when the defrosting exit time determined in the last defrosting is t3 as failing to meet the judging conditions, if Tg≥T1 for ta; or Tout≥T2, the defrosting exit time for next defrosting t=t3, otherwise the defrosting exit time for next defrosting t=t4 (t4 is yet another forced defrosting time at this time); when the defrosting exit time determined in the last defrosting is t3 as meeting the judging conditions, if Tg≥T1 for ta; or Tout≥T2, the defrosting exit time for next defrosting t=t2, otherwise the defrosting exit time for next defrosting t=t3 (t3 is another forced defrosting time at this time); and when the defrosting exit time determined in the last defrosting is t4 as failing to meet the judging conditions, if Tg≥T1 for ta; or Tout≥T2, the defrosting exit time for next defrosting t=t3, otherwise the defrosting exit time for next defrosting t=t4 (t4 is yet another forced defrosting time at this time), where t3 and t4 can be demarcated depending on actual situation.

In would be appreciated from the above embodiments that the defrosting exit time for next defrosting is determined based on a judging result from the last defrosting when the air conditioning performs defrosting, so as to allow a minor change of the defrosting exit time, which ensures the defrosting effect, restore normal heating of the air conditioning system as soon as possible, and improve user comfort.

It should be noted that, in the above embodiments, an option involving four defrosting exit times are illustrated, which can be increased or decreased depending on actual situation, which will not be elaborated herein.

Therefore, according to embodiments of the present disclosure, the defrosting control method for an air conditioning system can adjust the defrosting exit time for next defrosting according to the outlet temperature of the outdoor heat exchanger and its lasting period for the current defrosting, as well the outdoor ambient temperature during the current defrosting, such that the defrosting time can be increased in next defrosting to delay quitting from defrosting when it is impossible to melt frost completely in one-time defrosting where the frost layer is thick at a low temperature under rain and snow weather. When the frost layer is not thick under partially low temperature and low moisture environment, although a preset exit value is not achieved for the air conditioning system, the frost layer can be melt without extending the defrosting time. Accordingly, the defrosting exit time can be adjusted to the original defrosting exit time (e.g., the initial defrosting exit time) depending on parameter of the air conditioning system, which contributes to ensuring the defrosting effect, restoring normal heating of the air conditioning system as soon as possible, and improving indoor comfort influenced by heating failure of the indoor heat exchanger, without adversely affect subsequent heating.

In view of the above, according to embodiments of the present disclosure, the defrosting control method for an air conditioning system acquires a defrosting exit time determined in last defrosting when the air conditioning system performs defrosting every time; controls, according to the defrosting exit time determined in the last defrosting, the air conditioning system to perform current defrosting; acquires an outdoor ambient temperature and an outlet temperature of an outdoor heat exchanger in the current defrosting process of the air conditioning system; subjects the outdoor ambient temperature and the outlet temperature of the outdoor heat exchanger to respective judgments; and acquires and stores a forced defrosting time as a defrosting exit time for the air conditioning system to perform next defrosting, if the outlet temperature of the outdoor heat exchanger is lower than a first preset temperature for a preset time period and the outdoor ambient temperature is lower than a second preset temperature. Therefore, the present method can adjust the defrosting exit time according to the outdoor ambient temperature and the outlet temperature of the outdoor heat exchanger and its lasting period, so as to ensure the defrosting effect without adversely affecting the heat exchange effect.

Figure 3:
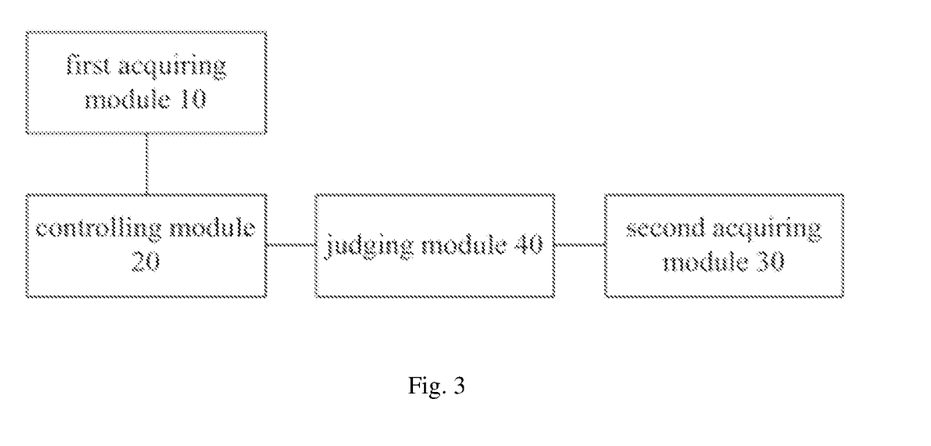
FIG. 3 is a block diagram showing a defrosting control device for an air conditioning system according to an embodiment of the present disclosure.

FIG. 3 is a block diagram showing a defrosting control device for an air conditioning system according to an embodiment of the present disclosure. As shown in FIG. 3, in embodiments of the present disclosure, the defrosting control device for an air conditioning system may include: a first acquiring module 10, a controlling module 20, a second acquiring module 30 and a judging module 40.

The first acquiring module 10 is configured to acquire a defrosting exit time determined in last defrosting when the air conditioning system performs defrosting every time. The controlling module 20 is configured to control, according to the defrosting exit time determined in the last defrosting, the air conditioning system to perform current defrosting. The second acquiring module 30 is configured to acquire an outdoor ambient temperature and an outlet temperature of an outdoor heat exchanger in the current defrosting process of the air conditioning system. The judging module 40 is configured to subject the outdoor ambient temperature and the outlet temperature of the outdoor heat exchanger to respective judgments. The controlling module 20 is further configured to acquire and store a forced defrosting time as a defrosting exit time for the air conditioning system to perform next defrosting, if the outlet temperature of the outdoor heat exchanger is lower than a first preset temperature for a preset time period and the outdoor ambient temperature is lower than a second preset temperature, wherein the forced defrosting time is longer than the defrosting time of the air conditioning system for performing the current defrosting.

In an embodiment of the present embodiment, in the current defrosting process of the air conditioning system, if the outlet temperature of the outdoor heat exchanger is higher than or equal to the first preset temperature for the preset time period, or if the outdoor ambient temperature is higher than or equal to the second preset temperature, the controlling module 20 is configured to take and store the defrosting time of the air conditioning system for performing the current defrosting as a defrosting exit time for the air conditioning system to perform next defrosting.

In an embodiment of the present embodiment, when the air conditioning system performs defrosting for the first time, the controlling module 20 is configured to acquire an initial defrosting exit time by the first acquiring module 10; and control the air conditioning system to perform the current defrosting according to the initial defrosting exit time.

In an embodiment of the present embodiment, in the first-time defrosting process of the air conditioning system, if the outlet temperature of the outdoor heat exchanger is higher than or equal to the first preset temperature for the preset time period, or if the outdoor ambient temperature is higher than or equal to the second preset temperature, the controlling module 20 is configured to take and store the initial defrosting exit time as the defrosting exit time for the air conditioning system to perform the next defrosting.

It should be noted that undisclosed details in respect to the defrosting control device for the air conditioning system according to embodiments of the present disclosure may refer to details disclosed in respect to the defrosting control method for the air conditioning system, which will not be elaborated herein.

According to embodiments of the present disclosure, the defrosting control device for an air conditioning system acquires by a first acquiring module, a defrosting exit time determined in last defrosting when the air conditioning system performs defrosting every time; controls by a controlling module, according to the defrosting exit time determined in the last defrosting, the air conditioning system to perform current defrosting; acquires by the second acquiring module, an outdoor ambient temperature and an outlet temperature of an outdoor heat exchanger in the current defrosting process of the air conditioning system; subjects by a judging module, the outdoor ambient temperature and the outlet temperature of the outdoor heat exchanger to respective judgments; and acquires and stores by the controlling module, a forced defrosting time as a defrosting exit time for the air conditioning system to perform next defrosting, if the outlet temperature of the outdoor heat exchanger is lower than a first preset temperature for a preset time period and the outdoor ambient temperature is lower than a second preset temperature. Therefore, the present device can adjust the defrosting exit time according to the outdoor ambient temperature and the outlet temperature of the outdoor heat exchanger and its lasting period, so as to ensure the defrosting effect without adversely affecting the heat exchange effect.

In addition, the present disclosure further provides in embodiments a non-transitory computer readable storage medium having stored therein a computer program that, when executed by a processor, causes the processor to perform a defrosting control method for an air conditioning system as described above.

By performing the defrosting control method for an air conditioning system as described above, the non-transitory computer readable storage medium according to embodiments of the present disclosure can adjust the defrosting exit time according to the outdoor ambient temperature and the outlet temperature of the outdoor heat exchanger and its lasting period, so as to ensure the defrosting effect without adversely affecting the heat exchange effect.

In addition, the present disclosure further provides in embodiments an air conditioning system, including the defrosting control device for an air conditioning system as described above.

With the defrosting control device for an air conditioning system as described above, the air conditioning system according to embodiments of the present disclosure can adjust the defrosting exit time according to the outdoor ambient temperature and the outlet temperature of the outdoor heat exchanger and its lasting period, so as to ensure the defrosting effect without adversely affecting the heat exchange effect.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples" in various places throughout this specification are not necessarily referring to the same embodiment or example of the present disclosure. Furthermore, the particular features, structures, materials, or characteristics may be combined in any suitable manner in one or more embodiments or examples. In addition, unless specified otherwise, those skilled in the art can combine different embodiments or examples and features in different embodiments or examples described in this specification.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two this features, like two or three, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

In the specification, it should be understood that, the terms such as "central", "longitudinal", "lateral", "width", "thickness", "above", "below", "front", "rear", "right", "left", "vertical", "horizontal", "top", "bottom", "inner", "outer", "clockwise", "counter-clockwise", "axial", "radial", "circumferential" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In the present invention, unless specified or limited otherwise, the terms "mounted", "connected", "coupled", "fixed" and the like are used broadly, and may be, for example, fixed connections, detachable connections, or integrated; may also be mechanical or electrical connections; may also be direct connections or indirect connections via intervening structures; may also be inner communications of two elements or mutual interaction between two elements, which can be understood by those skilled in the art according to specific situations.

In the present disclosure, unless specified or limited otherwise, a structure in which a first feature is "on" or "below" a second feature may be an embodiment in which the first feature is in direct contact with the second feature, or an embodiment in which the first feature and the second feature contacted indirectly via an intermediation. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

What is claimed is:

1. A defrosting control method for an air conditioning system, comprising the following steps:
    acquiring a defrosting exit time determined in last defrosting when the air conditioning system performs defrosting;
    controlling, according to the defrosting exit time determined in the last defrosting, the air conditioning system to perform current defrosting;
    acquiring an outdoor ambient temperature and an outlet temperature of an outdoor heat exchanger in the current defrosting of the air conditioning system;
    comparing the outdoor ambient temperature with a first preset temperature and the outlet temperature of the outdoor heat exchanger with a second preset temperature;
    acquiring a forced defrosting time for the air conditioning system when the outlet temperature of the outdoor heat exchanger is lower than the first preset temperature for a preset time period, and the outdoor ambient temperature is lower than the second preset temperature; and using the forced defrosting time for the defrosting exit time of the current defrosting, wherein the forced defrosting time is longer than the defrosting exit time of the air conditioning system for performing the current defrosting, wherein in the current defrosting of the air conditioning system, when the outlet temperature of the outdoor heat exchanger is higher than or equal to the first preset temperature for the preset time period, or when the outdoor ambient temperature is higher than or equal to the second preset temperature, the forced defrosting time of the air conditioning system for performing the current defrosting is taken and stored as the defrosting exit time for the air conditioning system to perform next defrosting.

2. The defrosting control method for the air conditioning system according to claim 1, wherein when the air conditioning system performs defrosting for a first time, an initial defrosting exit time is acquired, and the air conditioning system is controlled to perform the current defrosting according to the initial defrosting exit time.

3. The defrosting control method for the air conditioning system according to claim 2, wherein in the first time defrosting process of the air conditioning system, when the outlet temperature of the outdoor heat exchanger is higher than or equal to the first preset temperature for the preset time period, or when the outdoor ambient temperature is higher than or equal to the second preset temperature, taking and storing the initial defrosting exit time as the defrosting exit time for the air conditioning system to perform the next defrosting.

4. A non-transitory computer readable storage medium having stored therein a computer program that, when executed by a processor, causes the processor to perform the defrosting control method for the air conditioning system according to claim 3.

5. A non-transitory computer readable storage medium having stored therein a computer program that, when executed by a processor, causes the processor to perform the defrosting control method for the air conditioning system according to claim 2.

6. A non-transitory computer readable storage medium having stored therein a computer program that, when executed by a processor, causes the processor to perform the defrosting control method for the air conditioning system according to claim 1.

7. A defrosting control device for an air conditioning system, comprising:

a first acquiring module acquiring a defrosting exit time determined in last defrosting when the air conditioning system performs defrosting;

a controlling module controlling according to the defrosting exit time determined in the last defrosting, the air conditioning system to perform current defrosting;

a second acquiring module acquiring an outdoor ambient temperature and an outlet temperature of an outdoor heat exchanger in the current defrosting of the air conditioning system;

a judging module subjecting the outdoor ambient temperature and the outlet temperature of the outdoor heat exchanger to respective judgments;

wherein the controlling module increasing a defrosting exit time based on a forced defrosting time for the air conditioning system when the outlet temperature of the outdoor heat exchanger is lower than a first preset temperature for a preset time period, and the outdoor ambient temperature is lower than a second preset temperature, wherein the forced defrosting time is longer than the defrosting time of the air conditioning system for performing the current defrosting; and wherein in the current defrosting of the air conditioning system, when the outlet temperature of the outdoor heat exchanger is higher than or equal to the first preset temperature for the preset time period, or when the outdoor ambient temperature is higher than or equal to the second preset temperature, the controlling module is configured to take and store the increased defrosting time of the air conditioning system for performing the current defrosting as the defrosting exit time for the air conditioning system to perform next defrosting.

8. The defrosting control device for the air conditioning system according to claim 7, wherein when the air conditioning system performs defrosting for a first time, the controlling module is configured to:

acquire an initial defrosting exit time by the first acquiring module; and control the air conditioning system to perform the current defrosting according to the initial defrosting exit time.

9. The air conditioning system, comprising the defrosting control device for the air conditioning system according to claim 8.

10. The defrosting control device for the air conditioning system according to claim 8, wherein in the first time defrosting process of the air conditioning system, when the outlet temperature of the outdoor heat exchanger is higher than or equal to the first preset temperature for the preset time period, or when the outdoor ambient temperature is higher than or equal to the second preset temperature, the controlling module is configured to take and store the initial defrosting exit time as the defrosting exit time for the air conditioning system to perform the next defrosting.

11. The air conditioning system, comprising the defrosting control device for the air conditioning system according to claim 10.

* * * * *